United States Patent
Fernandez et al.

(10) Patent No.: US 10,144,211 B2
(45) Date of Patent: Dec. 4, 2018

(54) FRONT-TO-BACK REGISTRATION OF PRINTED CONTENT

(71) Applicant: HEWLETT-PACKARD DEVELOPMENT COMPANY, L.P., Houston, TX (US)

(72) Inventors: Cesar Fernandez, San Diego, CA (US); Srinivas Bhakthavatsalam, San Diego, CA (US); Carlos Millan, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 12 days.

(21) Appl. No.: 15/308,897

(22) PCT Filed: Jul. 24, 2014

(86) PCT No.: PCT/US2014/048010
§ 371 (c)(1),
(2) Date: Nov. 4, 2016

(87) PCT Pub. No.: WO2016/014062
PCT Pub. Date: Jan. 28, 2016

(65) Prior Publication Data
US 2017/0057213 A1     Mar. 2, 2017

(51) Int. Cl.
*B41F 13/02*     (2006.01)
*B41F 27/00*     (2006.01)
(Continued)

(52) U.S. Cl.
CPC ........... *B41F 27/005* (2013.01); *B41J 2/2135* (2013.01); *B41J 2/2146* (2013.01); *B41J 3/60* (2013.01);
(Continued)

(58) Field of Classification Search
CPC ........... G03G 15/6558; G03G 15/6561; G03G 2215/0161; B41J 2/2135; B41J 2/2146;
(Continued)

(56) References Cited

U.S. PATENT DOCUMENTS 5,384,592 A * 1/1995 Wong ................. G03G 15/0131
347/116
6,275,244 B1  8/2001 Omelchenko et al.
(Continued)

FOREIGN PATENT DOCUMENTS

EP         0729846        9/1996

*Primary Examiner* — David Banh
(74) *Attorney, Agent, or Firm* — HP Inc. Patent Department

(57) ABSTRACT

Examples disclosed herein relate to front-to-back registration of a printed content onto a print medium. In one example, a trigger signal generated by a sensor upon detection of a trigger mark on a first surface of a print medium is received. The trigger mark includes a leading edge and a trailing edge, wherein the leading edge and the trailing edge are non-parallel. Based on the trigger signal, a distance of the trailing edge from a point on the leading edge is determined. Once determined, a measure of lateral wander of the print medium with respect to the print path is obtained. The measure of the lateral wander is determined by comparing the distance between the leading edge and the trailing edge, with a threshold value.

19 Claims, 7 Drawing Sheets

(51) Int. Cl.
*B41J 2/21* (2006.01)
*B41J 3/60* (2006.01)
*B41J 11/46* (2006.01)
*B41J 15/04* (2006.01)
*G06K 15/02* (2006.01)

(52) U.S. Cl.
CPC .............. *B41J 11/46* (2013.01); *B41J 15/04* (2013.01); *G06K 15/1868* (2013.01)

(58) Field of Classification Search
CPC ... B41J 3/60; B41J 11/46; B41J 15/04; G06K 15/1868; B41F 33/0081; B41F 33/0036; B41F 13/025
See application file for complete search history.

(56) References Cited

U.S. PATENT DOCUMENTS

| | | |
|---|---|---|
| 6,599,040 B2 | 7/2003 | Nakazawa et al. |
| 6,827,419 B2* | 12/2004 | Buibas ................... B41J 3/4071 347/19 |
| 6,939,062 B2 | 9/2005 | Ogg et al. |
| 7,967,407 B2 | 6/2011 | Moscato et al. |
| 8,245,638 B2* | 8/2012 | Petersen ............ G03G 15/0142 101/211 |
| 2003/0002891 A1* | 1/2003 | Metzler .............. H04N 1/00063 399/301 |
| 2005/0174379 A1 | 8/2005 | Nakazawa et al. |
| 2009/0016785 A1 | 1/2009 | Haan et al. |
| 2010/0080643 A1 | 4/2010 | Toshito et al. |
| 2012/0081736 A1 | 4/2012 | Pinney et al. |
| 2012/0210895 A1* | 8/2012 | Loddenkoetter .......... B41F 5/24 101/481 |
| 2013/0155140 A1 | 6/2013 | Calamita et al. |
| 2015/0014918 A1* | 1/2015 | Piatt ........................ B65H 9/20 271/227 |
| 2015/0174934 A1* | 6/2015 | Bogart ................... B41J 29/393 347/19 |

* cited by examiner

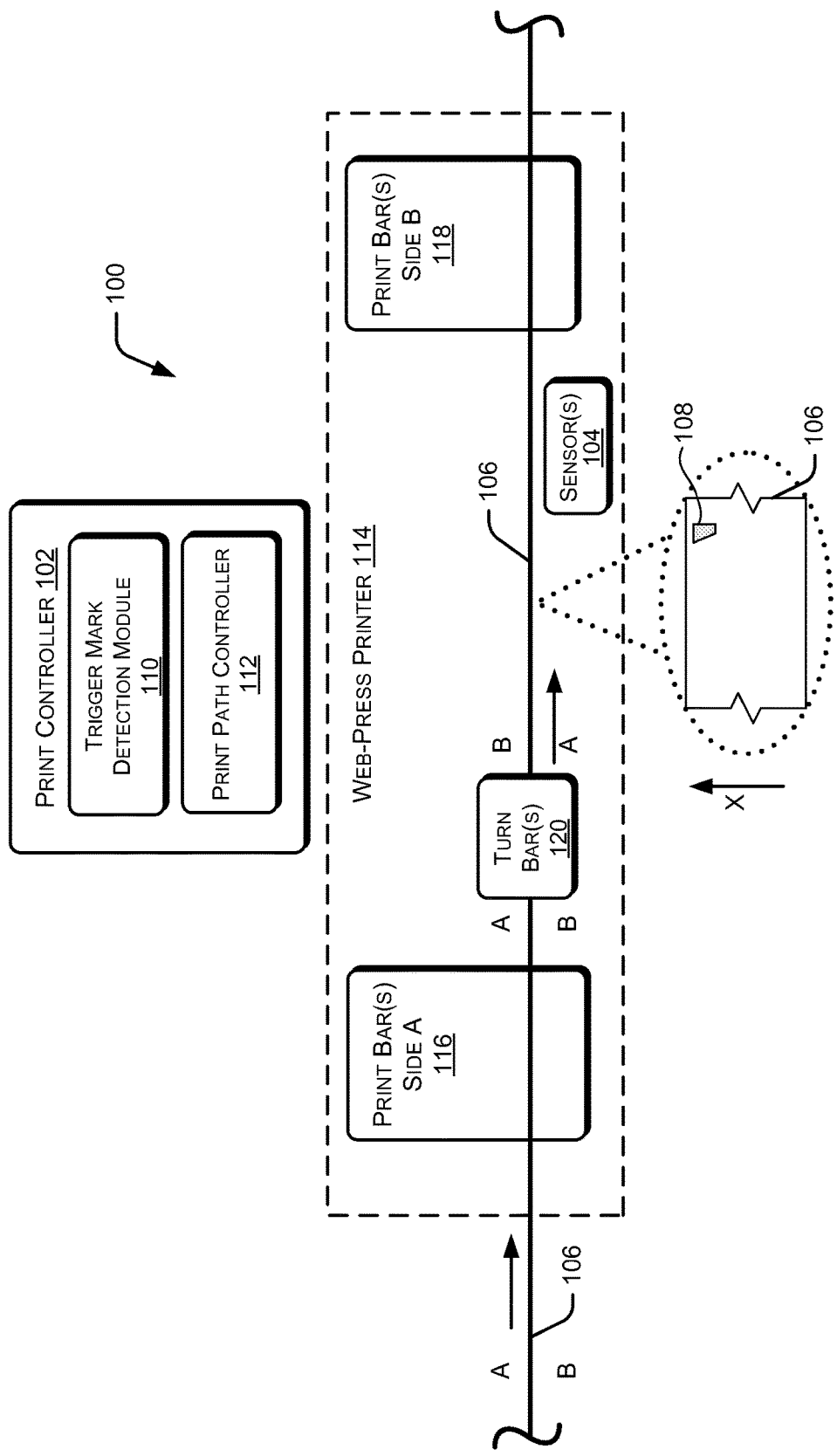

FRONT-TO-BACK REGISTRATION OF PRINTED CONTENT

BACKGROUND

Web-based printing presses utilize web-fed print medium, such as a paper, for producing material having printed content on a large scale, efficiently and quickly. Duplex printing may involve printed content on both sides of the print medium. For providing high-quality printed content it is desired that the content printed on both sides of the print medium is registered, or synchronized.

BRIEF DESCRIPTION OF THE DRAWINGS

The following detailed description references the drawings, wherein:

FIG. 1B is a network environment implementing an example system for front-to-back registration of a printed content onto a print medium;

DETAILED DESCRIPTION

Figure 1A:
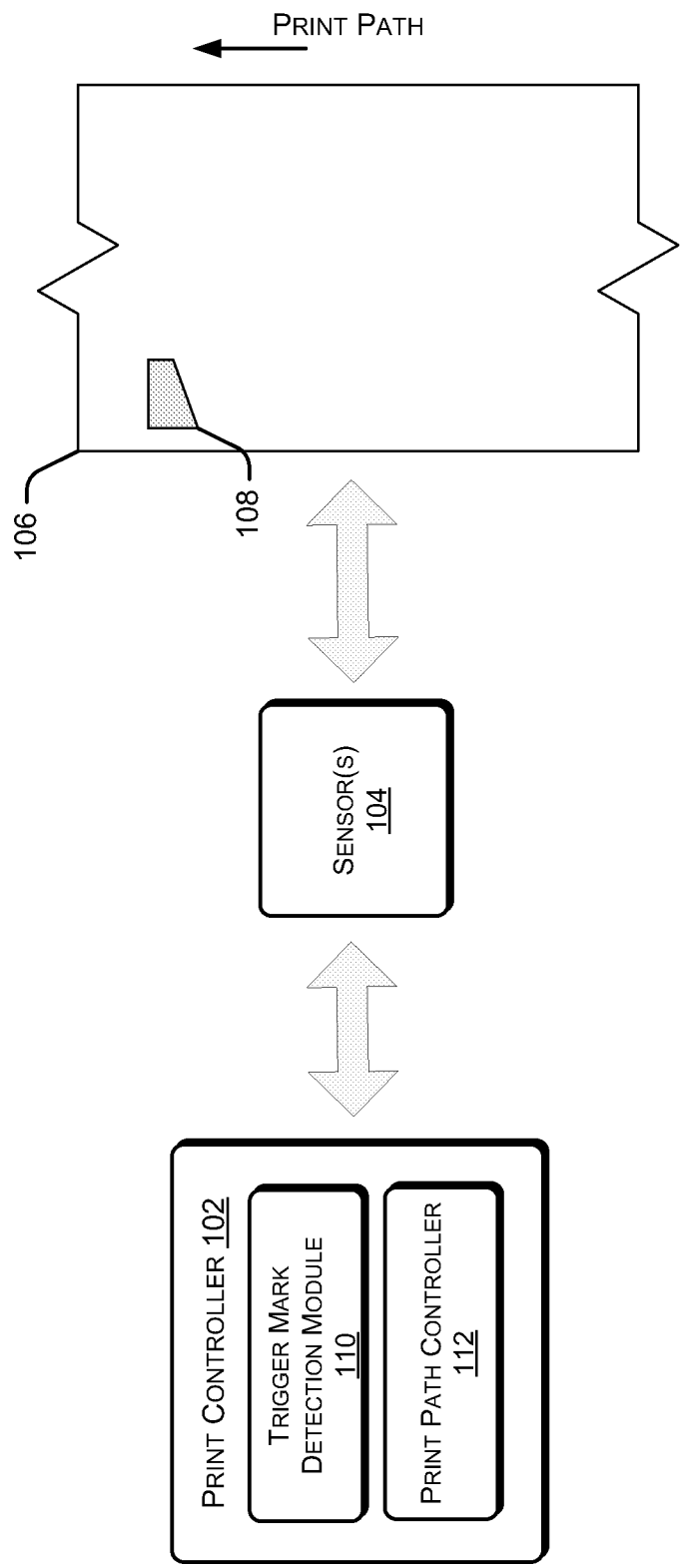
FIG. 1A is a block diagram of an example system for front-to-back registration of a printed content onto a print medium.

Large scale production of printed materials may involve printing large quantities of printed content. For producing printed materials, like books, on such scale of production generally web-presses are utilized. Such web-presses may be used for printing the desired content on a print medium such as paper. For sake of efficiency, such web-presses are web-fed, i.e., the print medium is supplied through rolls or webs of paper. The print medium is then passed through the web-press, where the desired content is printed continuously on the print medium as it passes through different sections of the web-press. In the end, the print medium may be cut appropriately to obtain the correctly sized pages to be used for producing the printed materials.

Duplex printing further allows printing of content on both sides of the print medium at different stages. In order to maintain a level of print quality, the printed content is registered. Registration of the printed content involves aligning the print area on both sides of the print medium. Such a process for aligning the printed content on both sides of the print medium is generally referred to as front-to-back registration. For achieving the highest quality of printing, registration is to be implemented in cross-web direction, i.e., across the width of the web or the print medium, and in down-web direction, i.e., along the length of the print medium.

Proper front-to-back registration, i.e., registration both in the cross-web and the down-web direction may involve timely initiating the printing on the other side of the print medium when one side of the print medium already has been printed with a portion of content. Generally, for front-to-back registration trigger marks may be used. The trigger marks, which are generally rectangular in shape, may be printed along with a portion of the content on one side of the print medium. As the print medium (with one side printed) proceeds along a print path within the web-press, the trigger marks are detected. Since the distance along the print path from the sensor to the print bars is known, the print bars may be activated accordingly for each detected trigger mark, and the content may be printed on the other side of the print medium. However, such mechanisms only achieve registration in the down-web direction.

Due to operation of the web-press or due to imperfections in the print medium, the print medium may move or wander laterally over rollers within the web-press. As a result, the positioning of the print medium with respect to print bars may get offset, which may prevent cross-web registration. As would be understood, print bars include one or more arrays of print heads, extending across the width of the print medium. In cases where the lateral wander is excessive, the position of the trigger mark may deviate to the extent that the sensor may fail to detect the trigger mark. As a result, the print bars would not be activated and no content would be printed on the other side of the print medium. This in turn would result in web-press downtime and wastages of the print medium.

Generally, to correct such an offset occurring due to the lateral wander of the print medium, methods based on detection of paper edge may be implemented. Alternatively, vision based systems which include high-speed image capturing device positioned relative to the print medium may also be used for achieving front-to-back registration. Such image capturing devices detect the lateral wander of the print medium based on the continuous images captured of the trigger marks. However, such mechanisms are expensive and require an additional set-up and hardware for controlling the lateral wander of the print medium.

Approaches for front-to-back registration of a printed content onto a print medium are described. In one example, a series of trigger marks are printed on one side of the print medium. The trigger marks may be printed along with a portion of the desired content which is to be printed on the print medium. Each of the trigger mark includes a leading edge and a trailing edge. The trigger mark is shaped in such manner that the leading edge and the trailing edge are not parallel to each other. Furthermore, the leading edge is perpendicular to the direction of the print path. In another example, the trigger mark is shaped as a trapezoid.

In operation, the print medium moves along the print path through the web-press. The trigger mark is subsequently detected by a sensor within the web-press. The detection of the trigger mark leading edge initiates the process to print the image on side B. As the print medium moves across the sensor, the sensor further determines the distance between the leading edge and the trailing edge for each of the trigger marks. For each of the measured distances between the leading edges and the trailing edges, a variation is determined. If the variation is within a threshold limit, it may be concluded that the lateral wander of the print medium is either absent or minimal. If however, the measured distance is either greater or less than the threshold limit, it may be concluded that the print medium has wandered laterally.

On determining that the print medium has laterally wandered, the lateral wandering may be further compensated, and the other portion of the content is printed on the other side of the print medium. In one example, the compensating may be affected either digitally or mechanically. For example, in case of the former approach, the content to be printed is rendered and printed, taking into account the offset caused due to the lateral wander of the print medium. For the latter approach, a steering mechanism within the web-press may be controlled so that the lateral wander of the print medium may be negated and the print medium is further aligned along the print path. As mentioned above, once compensated, the content is printed on the other side of the print medium.

Furthermore, the resolution at which the variations in the distances between the leading edge and the trailing edge are detected, may be changed by changing the slope of the trailing edge. For example, trigger marks where the trailing edge is more sloped would provide a more sensitive trigger mark based on which the variations in the distances between the leading and the trailing edges can be detected. Similarly, in applications where lesser sensitivity is desired, the slope of the trailing edge may be less.

The above approaches may be implemented in one or more computing devices which are in communication with the web-press. In the manner as described above, the front-to-back registration, i.e., the cross-web and the down-web registration is achieved without employing any additional mechanism, or without structural modifications to existing web-presses. Since the front-to-back registration is achieved, wastages in time (due to web-press downtime) and of the print medium is also avoided.

Examples are further described herein with reference to FIGS. 1A-1B, and FIGS. 2-6. It should be noted that the description and figures relate to example implementations, and should not be construed as a limitation to the present subject matter. It is thus understood that various arrangements may be devised that, although not explicitly described or shown herein, embody the principles of the present subject matter. Moreover, all statements herein reciting principles, aspects, and embodiments of the present subject matter, as well as specific examples, are intended to encompass equivalents thereof.

FIGS. 1A and 1B provide block diagrams for an example print controller 102 for front-to-back registration of a printed content onto a print medium. In the present example as illustrated in FIG. 1A, the print controller 102 may be further in communication with one or more sensor(s) 104. Such sensor(s) 104 are deployed within a web-press. In operation, a print medium 106 on which the content is to be registered, passes through the web-press. The print medium passes through the web-press following a print path. While moving across the print path, the print medium 106 moves in the direction as depicted. The print medium 106 as illustrated, includes at least one trigger mark 108. The trigger mark 108 further includes a leading edge and a trailing edge. The leading edge and the trailing edge are not parallel to each other. As a result, the perpendicular distance from the leading edge to the trailing edge changes as one moves from one side edge of the trigger mark 108 to the other side edge. The leading edge is perpendicular to the direction in which the print medium 106 moves. The trigger mark 108 is depicted as a trapezoid, however other shaped trigger marks 108 would also be within the scope of the present subject matter.

FIG. 1B provides, in another example, block diagrams of the print controller 102 within a printing environment 100.

In the environment 100, the print controller 102 includes a trigger mark detection module 110 and a print path controller 112. The print controller 102 is communicatively coupled to a web-press printer 114. The web-press printer 114 prints the desired content on both sides, i.e., on both sides A and B of the print medium 106, based on instructions received from the print controller 102. For sake of explanation only, the sides or the printable surfaces of the print medium 106 are depicted as side A and side B. The web-press printer 114 in turn includes sensor(s) 104 so positioned such that the sensor(s) 104 are directed towards one side, side A of the print medium 106. The web-press printer 114 may further include print bar(s) 116, 118 for both sides A and B, respectively. Each of the print bar(s) 116 and the print bar(s) 118 may include an array of print-heads which dispense ink drops at coordinated time instants for printing content onto the print medium 106. As should also be noted, each of the print bar(s) 116 and the print bar(s) 118 are so structured so as to extend over the width of the print medium 106. The print bar(s) 116 prints the trigger mark 108 and content, or portion thereof, on side A of the print medium 106. The print bar(s) 118 print the remaining portion of the content onto side B based on the detection of the trigger mark 108. In one example, the web-press printer 114 may further include a turn bar(s) 120 which flips the print medium 106 so that the side B of the print medium 106 faces the print bar(s) 118.

In operation, the desired content for printing may be configured and processed for printing by the print controller 102. Once processed, the print controller 102 may initiate printing of side A of the print medium 106. For printing, the print controller 102 may transmit one or more control signals to print bar(s) 116. On receiving the control signals from the print controller 102, the print bar(s) 116 prints content or a portion thereof onto side A of the print medium 106. In one example the print bar(s) 116 may also print a trigger mark 108. It should also be noted that the content printed on side A of the print medium 106 may be content for multiple pages of printed material, such as books. As a result, while printing the content, the print bar(s) 116 prints a series of trigger marks 108. The trigger marks 108 may be printed in close proximity to the edge of the print medium 106.

As the print medium 106 advances in the direction of the print path (as depicted in FIG. 1B), the trigger mark 108 moves across one or more sensor(s) 104. As the print medium 106 moves, the sensor(s) 104 detects the trigger mark 108. In one example the sensor(s) 104 may be positioned such that owing to the advancing of the print medium 106, the middle point of the leading edge of the trigger mark 108 passes under the sensor(s) 104. As the print medium 106 passes under the sensor(s) 104, the distance between the leading edge and the trailing edge is measured. Similarly, measured distances for multiple such trigger marks 108 are obtained. In one example the sensor(s) 104 senses or detects the presence of the leading edge and the trailing edge of the trigger mark 108. On detecting, the sensor(s) 104 may generate and transmit one or more signals to the print controller 102. On receiving the signals, the trigger mark detection module 110 (referred also as detection module 110 for sake of brevity) determines the measured distances between the leading and the trailing edges of the each of the trigger marks 108.

Once the measured distances are obtained for such multiple trigger marks 108, the detection module 110 further determines the variations between such measured distance for each of the multiple trigger marks 108. As also briefly mentioned above, due to the operational motion of the web-press printer 114 or due to imperfections in the web of print medium 106, the print medium 106 may shift or wander laterally over the rollers within the web-press printer 114. As a result, the relative positioning of the print heads 116 and the print bar(s) 118 with respect to the print medium 106 may change during the operation of the web-press printer 114.

Returning to the present subject matter, the detection module 110, based on the variation in measured distances between the leading and the trailing edges of the trigger marks 108, determines whether the print medium 106 is undergoing lateral wander or not. For example, the detection module 110 may determine that the variations in the measured distances is negative, i.e., based on determination that the distance between the leading and the trailing edges of the successive trigger marks 108 is decreasing. In such a case, it may be concluded that the print medium 106 is undergoing a lateral wander in the X-direction as depicted in FIG. 1 B. Conversely, if the variation in the measured distances is positive, it may be concluded that the print medium 106 is undergoing lateral wander opposite to the X-direction.

Depending on the direction in which the lateral wander occurs, the detection module 110 may communicate with the print path controller 112. The print path controller 112 subsequently compensates for the lateral wander. The compensation may be affected either digitally or through mechanical means. For example, the print controller 102 may further process the digital data corresponding to content so that the print data is rendered in a manner which accounts for the lateral wander. For compensating mechanically, the print path controller 112 may transmit control signals to a steering mechanism (not shown) of the web-press printer 114, to mechanically steer the print medium 106 as it advances along the print path. In one example, prior to reaching the print bar(s) 118, the print medium 106 may pass through one or more turn bar(s) 120 which flip the print medium 106, such that the side B faces the print heads of the print bar(s) 118.

As the lateral wander has been compensated, synchronously the print controller 102 transmits control signals to the print bar(s) 118 for printing the remaining content on side B of the print medium 106. The compensation of the lateral wander is implemented gradually to adjust the print medium 106 against the lateral wander, and during the printing process. In one example, the printing onto side B is triggered based on the leading edge. In such a case, the print controller 102 may determine the time instant at which the leading edge of the trigger mark 108 was detected. Since the distance between the sensor(s) 104 and the print bar(s) 118 is predetermined, the print controller 102 may further determine another time instant at which the print bar(s) 118 should be activated for printing the content onto side B. Once determined, the content is printed onto side B by the print bar(s) 118. The duplex print medium 106 may be subsequently pulled away and further processed for manufacturing printed materials.

Figure 2:
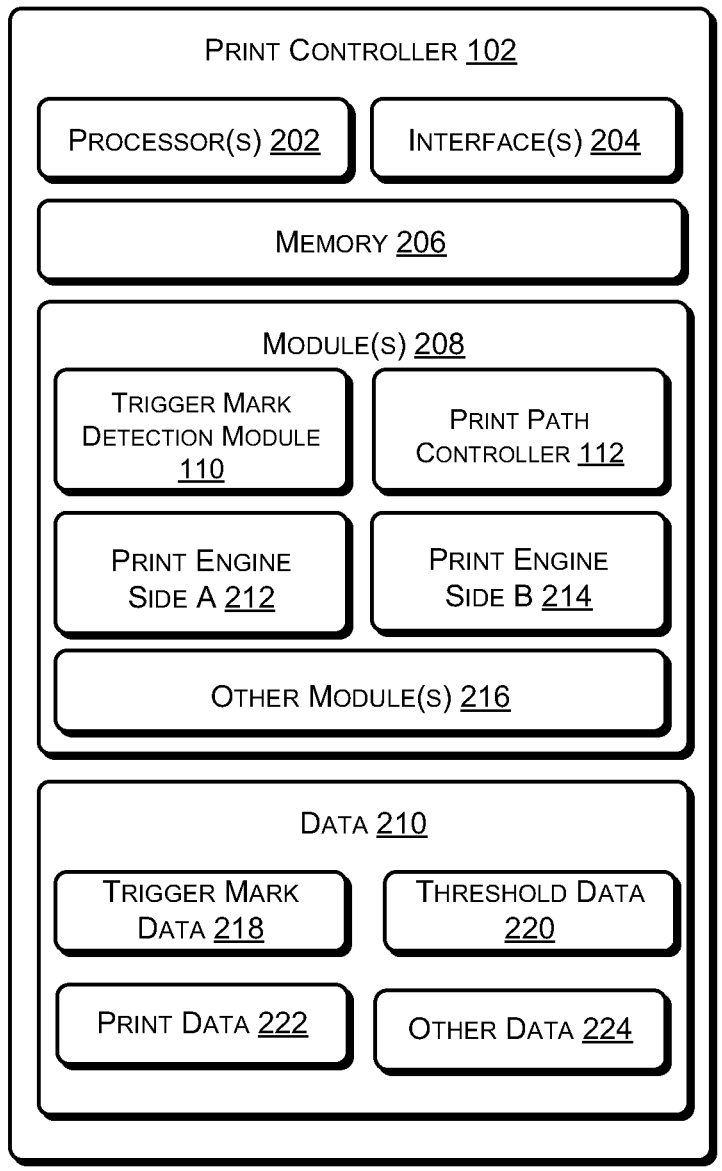
FIG. 2 is a block diagram of another example system for front-to-back registration of a printed content onto a print medium.

FIG. 2 illustrates an example print controller 102 for front-to-back registration of a printed content onto a print medium. The print controller 102 may be implemented as described above, for example. In another example, the print controller 102 may be implemented as a combination of servers, or other computing devices for controlling the operative elements of a web-press, such as a web-press printer 114. The print controller 102 includes processor(s) 202, interface(s) 204 and memory 206. The processor(s) 202 may also be implemented as signal processor(s), state machine(s), logic circuitries, and/or any other device or component that manipulate signals based on operational instructions.

The interface(s) 204 may include a variety of interfaces, for example, interfaces for data input and output devices, referred to as I/O devices, storage devices, network devices, and the like, for communicatively associating the print controller 102 with a web-press, such as a web-press printer 114. The interface(s) 204 facilitate communication between the print controller 102 and various other computing devices connected in a network environment. The memory 206 may store one or more computer-readable instructions, which may be fetched and executed so as to cause to provide front-to-back registration of a printed content onto a print medium. The memory 206 may include any non-transitory computer-readable medium including, for example, volatile memory such as RAM, or non-volatile memory such as EPROM, flash memory, and the like.

The print controller 102 may further include module(s) 208 and data 210. The module(s) 208 may be implemented as a combination of hardware and programming (e.g., programmable instructions) to implement one or more functionalities of the module(s) 208. In one example, the module(s) 208 include the trigger mark detection module 110, the print path controller 112, and print engines 212, 214 for side A, B of the print medium 106 respectively. The print controller 102 may further include other module(s) 216 for implementing functionalities that supplement applications or functions performed by the print controller 102.

In examples described herein, such combinations of hardware and programming may be implemented in a number of different ways. For example, the programming for the module(s) 208 may be processor executable instructions stored on a non-transitory machine-readable storage medium and the hardware for the module(s) 208 may include a processing resource (e.g., one or more processors), to execute such instructions. In the present examples, the machine-readable storage medium may store instructions that, when executed by the processing resource, implement module(s) 208 or their associated functionalities. In such examples, the print controller 102 may include the machine-readable storage medium storing the instructions and the processing resource to execute the instructions, or the machine-readable storage medium may be separate but accessible to print controller 102 and the processing resource. In other examples, module(s) 208 may be implemented by electronic circuitry.

The data 210 includes data that is either predefined or generated as a result of the functionalities implemented by any of the module(s) 206. In the foregoing example, the data 210 may include trigger mark data 218, threshold data 220, print data 222, and other data 224. The other data 224 may include data generated and saved by the module(s) 208 for implementing various functionalities of the print controller 102.

Figure 3:
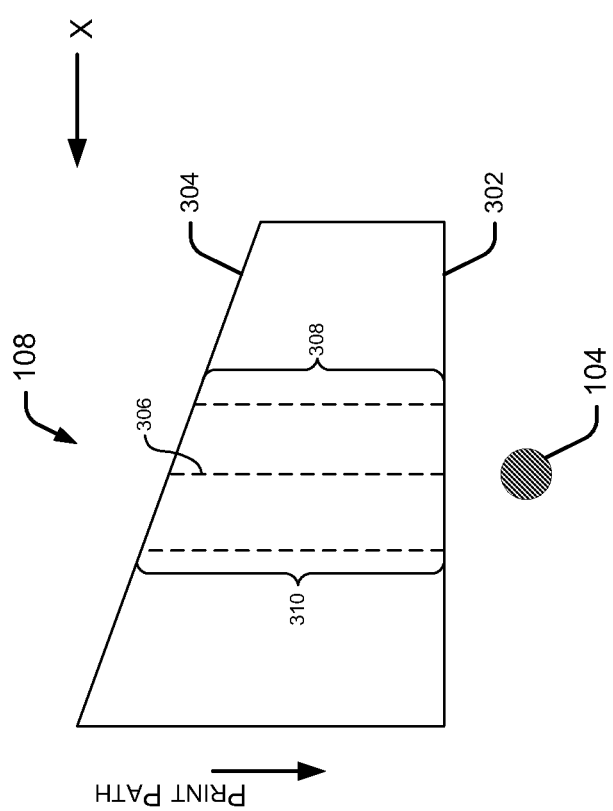
FIG. 3 is an example illustration depicting a trigger mark for front-to-back registration of a printed content onto a print medium.

The operation of the print controller 102 is presently described in conjunction with FIG. 3. FIG. 3 depicts an expanded view of the trigger mark 108 interacting with the sensor(s) 104. The trigger mark 108 has leading edge 302 and trailing edge 304. The leading edge 302 and the trailing edge 304 are non-parallel with each other, and hence are separated by a non-uniform distance. The leading edge 302 of the trigger mark 108 may be perpendicular to direction in which the print medium 106 advances along the print path. Although depicted as a trapezoid, the trigger mark 108 may be of any shape in which the leading edge and the trailing edge are non-parallel, without deviating from the scope of the present subject matter.

In operation, the print controller 102 may be configured with the content which is to be printed. The content for printing may be stored in a digital format in print data 222. In one example, the print data 222 may be processed first by the print engine 212. As mentioned previously, the print engine 212 processes the print data 222 for printing the desired content on side A of the print medium 106. Based on the processing of the print data 222, the print engine 212 further renders the content for printing on the print medium 106. In the present example, the print engine 212 further renders a trigger mark, such as trigger mark 108, for printing on side A of the print medium 106.

Based on the rendering of the print data 222, the print controller 102 may transmit control signals to a web-press, such as a web-press printer 114 for printing the content and the trigger mark 108 on side A of the print medium 106. As should also be noted, the print controller 102 may print, at multiple instants, the content on side A corresponding to a page of printed content. Similarly, a series of trigger marks 108 are also printed based on which corresponding content may be printed on the other side of the print medium 106.

Once the content is processed and rendered, the print bar(s) 116 prints the content and the trigger mark 108 on side A of the print medium 106. The print medium 106 with the printed side A advances along the print path within the web-press printer 114. As the print medium 106 advances, the trigger mark 108 is detected by the sensor(s) 104. During detection, the sensor(s) 104 first detect a leading edge 302 of the trigger mark 108. The sensor(s) 104 may be so positioned such that sensor(s) 104 passes over a point about the centre of the leading edge 302. As the print medium 106 continues to advance along the print path, the sensor(s) 104 further detects the trailing edge 304. In one example, the sensor(s) 104 may transmit trigger signals on detecting the leading edge 302 and the trailing edge 304 of each of the trigger marks 108. The signals are received by trigger mark detection module 110. On receiving of the trigger signals from the sensor(s) 104, the detection module 110 determines the distance 306 between the leading edge 302 and the trailing edge 304 of the trigger mark 108. In one example, the measured distance 306 is stored in the trigger mark data 218.

In operation, each leading edge 302 and trailing edge 304 of the series of the trigger marks are detected. The detection module 110 subsequently determines distances, such as distance 306, between each such leading edge 302 and trailing edge 304, which are stored in trigger mark data 218. As also described previously, the print medium 106 may shift laterally over the print rollers, such as print rollers of the web-press printer 114. The lateral shifting, also referred to as a lateral wander, may result in a change in the relative position of the trigger mark 108 with the sensor(s) 104, when compared with respect to the previous trigger marks 108 detected by the sensor(s) 104.

Owing to the leading edge 302 and the trailing edge 304 of the trigger mark 108 being non-parallel, any change in the lateral direction of the position of the print medium 106, would also result in variations in the measured distances 306. For example, if the print medium 106 laterally wanders in the X-direction, the relative position of the sensor(s) 104 with respect to the print medium 106 would change. Consequently, the distance between the leading edge 302 and the trailing edge 304 would reduce and change to distance 308. Similarly, if the print medium 106 shifts laterally in a direction opposite to the X-direction, the measured distance would increase and change to distance 310.

The detection module 110 further compares the distance 308 or distance 310 with one or more threshold values stored in threshold 220. The different values stored in threshold data 220 may be used for varying the sensitivity of detecting the lateral wander of the print medium 106. As should be noted, the threshold values provide the limits within which the lateral wander may occur. On determining the distances 308, 310 to be less than or greater than, respectively, with the threshold data 220, the print path controller 112 may generate control signals for compensating the lateral wander of the print medium 106.

The compensation of the lateral wander may be implemented either mechanically or digitally. For example, in case of mechanical compensation, the web-press printer 114 may further include a steering mechanism. The steering mechanism receives one or more control signals for compensating the lateral wander from the print path controller 112 of the print controller 102. On receiving the control signals, the steering mechanism may further control the print path of the print medium 106, so as to offset the lateral wander of the print medium 106. For example, if the lateral wander is determined to occur in the X-direction, the steering mechanism may control the print path so as to offset the lateral wander of the print medium 106.

For digitally compensating the lateral wander, the control signals may be received by the print engine 214, i.e., the print engine for printing content onto side B of the print medium 106. On receiving the control signals, the print engine 214 may further process the print data corresponding to the content to be printed on side B. On processing, the print engine 214 may further render the content to be printed by shifting the position of the rendered content. The content is subsequently printed in a shifted manner, so as to offset the lateral wander of the print medium 106. As would be appreciated, a separate steering mechanism would not be required when the lateral wander is to be compensated.

Once the compensating has been implemented, the print bar(s) 118 are further activated by the print controller 102 for printing the content on side B of the print medium 106. For example, the detection module 110 may, based on the distance between the sensor(s) 104 and the print bar(s) 118, determine a time instant at which the print bar(s) 118 is to be activated. At the appropriate time instant, the print bar(s) 118 may be activated for printing the content onto side B of the print medium 106. In the present example, the print bar(s) 118 may be triggered based on the detection of the leading edge 302 of the trigger mark 108. Since any lateral wander that may have occurred has been compensated, the content printed on side B of the print medium 106 is registered in the down-web and the cross-web direction.

Figure 4:
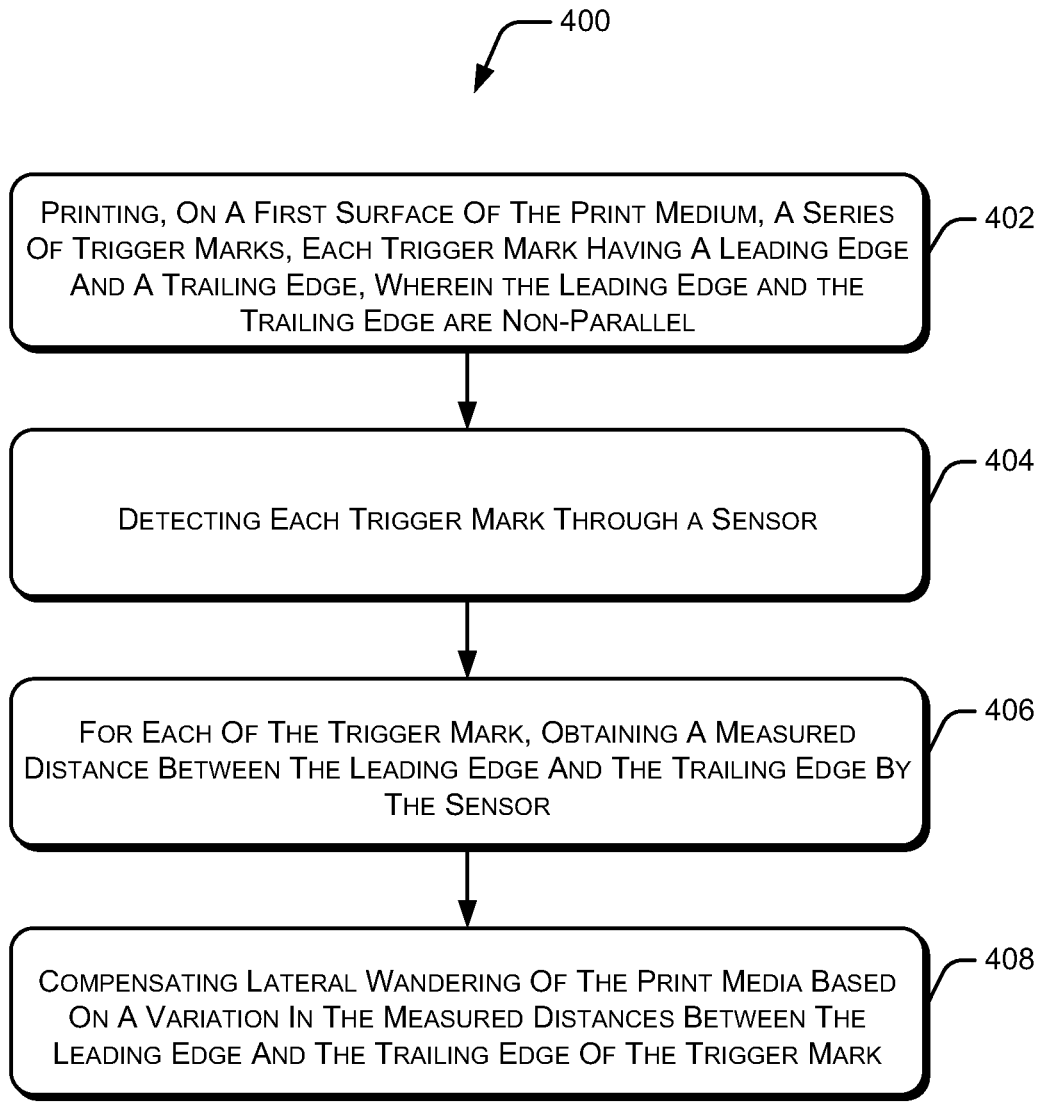
FIG. 4 is a flowchart of an example method for front-to-back registration of a printed content onto a print medium.
Figure 5:
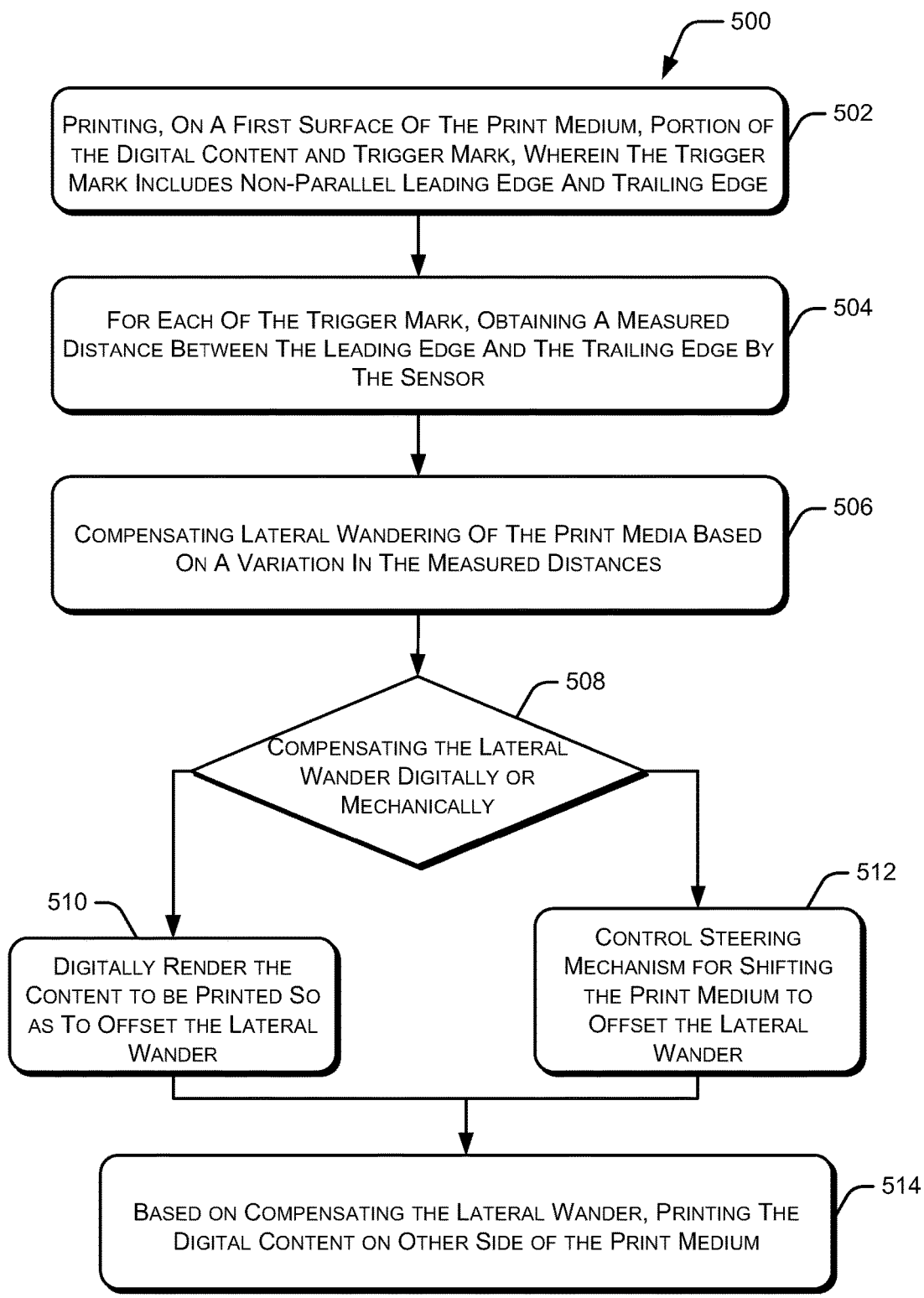
FIG. 5 is a flowchart of another example method for front-to-back registration of a printed content onto a print medium.

FIGS. 4 and 5 illustrate example methods 400 and 500, respectively, for front-to-back registration of a printed content onto a print medium, according to an implementation of the present subject matter. The order in which the methods are described is not intended to be construed as a limitation, and any number of the described method blocks may be combined in any order to implement the aforementioned methods, or an alternative method. Furthermore, methods 400 and 500 may be implemented by processing resource or computing device(s) through any suitable hardware, non-transitory machine readable instructions, or combination thereof.

It may also be understood that methods 400 and 500 may be performed by programmed computing devices, such as the print controller 102 as depicted in FIGS. 1A-1B, and FIG. 2. Furthermore, the methods 400 and 500 may be executed based on instructions stored in a non-transitory computer readable medium, as will be readily understood. The non-transitory computer readable medium may include, for example, digital memories, magnetic storage media, such as one or more magnetic disks and magnetic tapes, hard drives, or optically readable digital data storage media.

Although, the methods 400 and 500 are described below with reference to the print controller 102 as described above, other suitable systems for the execution of these methods can be utilized. Additionally, implementation of these methods is not limited to such examples.

Referring to FIG. 4, at block 402 content along with a series of trigger mark is printed on a first side of a print medium. For example, the print bar(s) 116 of a web-press printer 114 prints the desired content on side A of print medium 106. Besides the desired content, the print bar(s) 116 further prints a series of trigger marks 108 on side A of the print medium 106. Each of the trigger marks 108 includes a leading edge (e.g., leading edge 302) and a trailing edge (e.g., trailing edge 304). The trigger marks 108 are so shaped such that the leading edge and the trailing edge are non-parallel. In one example, the trigger mark 108 is shaped as a trapezoid.

At block 404, each of the trigger mark is detected by one or more sensor within a web-press. For example, the sensor(s) 104 are positioned with respect to the print medium 106 as it advances along the print path. As the print medium 106 advances, the trigger marks 108 are detected by the sensor(s) 104. In one example, the sensor(s) 104 is a spot sensor.

At block 406, for each of the trigger mark, a measured distance between the leading edge and the trailing edge is determined. For example, the sensor(s) 104 may detect the leading edge 302 and the trailing edge 304 for each of the trigger marks 108. As the sensor(s) 104 detects, one or more trigger signals are generated and received by the trigger mark detection module 110. The detection module 110, based on the trigger signals received from the sensor(s) 104, determine the distance between the leading edge 302 and the trailing edge 304 of the trigger mark 108.

At block 408, any lateral wander produced occurring in the print medium is compensated based on a variation of the measured distances for each of the trigger marks. For example, the distances between the leading edge 302 and the trailing edge 304 of each of the trigger marks 108 are determined. Any variations in the distances between the leading edge 302 and the trailing edge 304 are indicative of a lateral wander. On determining that the measured distance are beyond a threshold range stored in threshold data 220, the print path controller 112 may compensate, either digitally or mechanically, to offset the lateral wander of the print medium 106.

FIG. 5 provides another example method 500 for front-to-back registration of a printed content onto a print medium. At block 502, a trigger mark is printed on one side of a print medium. For example, a print controller 102 may process the data to be printed and accordingly, provides control instructions to a web-press, such as web-press printer 114, for printing the desired content on a print medium 106. Initially, the desired content is printed on one side of the print medium 106. Along with the desired content, a trigger mark 108 is also printed. The trigger mark 108 is so shaped such that a leading edge, e.g., leading edge 302, and a trailing edge, e.g., trailing edge 304, are non-parallel.

At block 504, distance between the leading edges and the trailing edges is obtained. For example, as the print medium 106 moves along the print path, the trigger mark 108 also moves with respect to the sensor(s) 104. As the trigger mark 108 moves across the sensor(s) 104, the sensor(s) 104 detect the leading edge 302 and the trailing edge 304 of the trigger mark 108. On detection, the sensor(s) 104 may generate one or more detection signals. Based on the detection signals, the detection module 110 may determine the distance between the leading edge 302 and the trailing edge 304 of the trigger mark 108. In one example, the distance is a determined from a mid-point on and perpendicular from the leading edge 302. In a similar manner, for multiple trigger marks 108 the distance between the corresponding leading edge 302 and trailing edge 304, is determined.

At block 506, any lateral wandering of a print medium is corrected based on variations in the distances between the leading edge and the trailing edge. For example, the detection module 110 may determine whether any variations occur in the measured distances 306. In case it is determined that the measured distance is increasing or decreasing over the course of operation of the web-press printer 114, the print path controller 112 may compensate the lateral wander of the print medium 106.

At block 508, the compensation can be made digitally or mechanically. For example, the detection module 110 may determine the lateral wander of the print medium 106 is to be compensated digitally (Digital Compensation' path from block 508). On determining that the lateral wander is to be compensated digitally (block 510), the print engine 214 may further process the data corresponding to the content being printed. While processing, the print engine 214 may render the digital content to be printed in such a manner so as to offset the lateral wander of the print medium 106. In one example, the content may be printed in a shifted manner on side B of the print medium 106.

However, if the compensation is to be performed mechanically ('Mechanical Compensation' path from block 508), the print path controller 112 may further activate a steering mechanism within the web-press printer 114 for controlling the position of the print medium 106 along the print path. The steering mechanism may, based on instructions received by the print path controller 112, adjust the position of the print medium 106 along the print path.

At block 514, based on the compensating, the content is printed on the other side of the print medium. For example, once the lateral wander has been compensated the print bar(s) 118 print the desired content on the other side, i.e., side B of the print medium 106. Based on the compensation, the content printed on side B of the print medium 106, is registered in the cross-web and the down-web direction.

Figure 6:
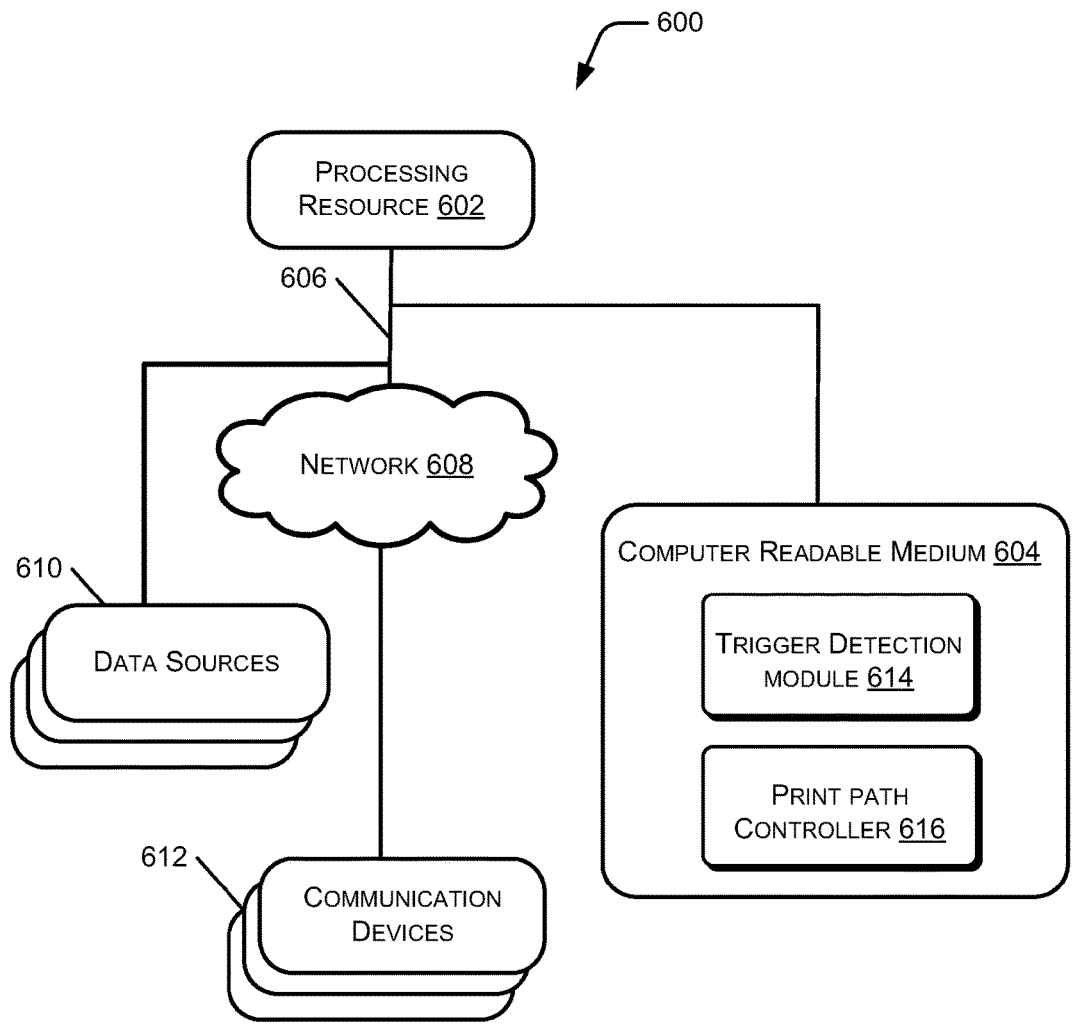
FIG. 6 is a block diagram of an example system implementing a non-transitory computer-readable medium, for front-to-back registration of a printed content onto a print medium.

FIG. 6 illustrates a system environment 600 to provide front-to-back registration of a printed content onto a print medium, according to an example of the present disclosure. The system environment 600 may comprise at least a portion of a public networking environment or a private networking environment, or a combination thereof. In one implementation, the system environment 600 includes a processing resource 602 communicatively coupled to a computer readable medium 604 through a communication link 606.

For example, the processing resource 602 can include one or more processors of a computing device for providing front-to-back registration of a printed content onto a print medium. The computer readable medium 604 can be, for example, an internal memory device of the computing device or an external memory device. In one implementation, the communication link 606 may be a direct communication link, such as any memory read/write interface. In another implementation, the communication link 606 may be an indirect communication link, such as a network interface. In such a case, the processing resource 602 can access the computer readable medium 604 through a network 608. The network 608 may be a single network or a combination of multiple networks and may use a variety of different communication protocols.

The processing resource 602 and the computer readable medium 604 may also be coupled to data sources 610 through the communication link 606, and/or to communication devices 612 over the network 608. The coupling with the data sources 610 enables in receiving the data in an offline environment, and the coupling with the communication devices 612 enables in receiving the data in an online environment.

In one implementation, the computer readable medium 604 includes a set of computer readable instructions, implementing trigger mark detection module 614 and a print path controller 616. The set of computer readable instructions can be accessed by the processing resource 602 through the communication link 606 and subsequently executed to process data communicated with the data sources 610 in order to provide front-to-back registration of a printed content onto a print medium. When executed by processing resource 602, the instructions of the trigger mark detection module 614 (hereinafter referred to as detection module 614) may perform the functionalities described above in relation to detection module 110. When executed by processing resource 602, the instructions of print path controller 616 may perform the functionalities described above in relation to print path controller 112.

For example, a series of trigger marks, such as trigger marks 108, printed on one side of the print medium are detected by one or more sensors, such as sensor(s) 104. The trigger marks may be printed along with a portion of the desired content which is to be printed on the print medium. Each of the trigger mark includes a leading edge and a trailing edge. The trigger mark is so shaped such that the leading edge and the trailing edge are not parallel to each other. Furthermore, the leading edge is perpendicular to the direction of the print path. In another example, the trigger mark is shaped as a trapezoid.

The sensor(s) 104 on detecting the trigger mark generates signals which are received by the detection module 614. As the print medium moves across the sensor, the detection module 614 determines the distance between the leading edge and the trailing edge for each of the trigger marks 108. For each of the measured distances between the leading edges and the trailing edges, the detection module 614 determines a variation in the measured distances. On determining that the variation is within a threshold limit, the detection module 614 determines that the lateral wander of the print medium is either absent or minimal. If however, the measured distance is either greater than the threshold limit, the detection module 614 may conclude that the print medium has wandered laterally. In one example, the threshold limit may be stored in threshold data 220.

On determining that the print medium has laterally wandered, the lateral wandering may be further compensated by the print path controller 616, and the other portion of the content is printed on the other side of the print medium. In one example, the compensating may be affected either digitally or mechanically. For example, in case of digital compensating, the content to be printed is rendered and printed, taking into account the offset caused due to the lateral wander of the print medium. In such a case, the print engine 214 may further process the data to be printed to render the data to counter the lateral wander of the print medium 106. The data associated with the content to be printed may be stored in print data 222.

For the latter approach, the print path controller 616 may control a steering mechanism within the web-press so that the lateral wander of the print medium may be negated and the print medium is further aligned along the print path. Once the lateral wander has been compensated, the content is printed on the other side of the print medium, say using the print bar(s) 118 of the web-press printer 114.

Although examples for the present disclosure have been described in language specific to structural features and/or methods, it should be understood that the appended claims are not necessarily limited to the specific features or methods described. Rather, the specific features and methods are disclosed and explained as examples of the present disclosure.

We claim:

1. A method for providing front-to-back registration of printed content on a print medium, the method comprising:
    printing, on a first surface of the print medium advancing in a print path direction, a series of trigger marks, each of the trigger marks including a leading edge and a trailing edge which are not parallel to each other;
    detecting the leading edge and the trailing edge of each of the trigger marks;
    obtaining, for each of the trigger marks, a distance between the leading edge and the trailing edge, based on the detecting; and
    compensating for lateral wandering of the print medium with respect to the print path direction based on a variation in the distance between the leading edge and the trailing edge for each of the trigger marks, including determining a measure of the lateral wandering of the print medium and digitally rendering for printing another portion of the printed content on a second surface of the print medium to offset the measure of the lateral wandering.

2. The method as claimed in claim 1, wherein the leading edge is perpendicular to the print path direction.

3. The method as claimed in claim 1, wherein the printing further comprises, printing a first portion of the printed content on the first surface of the print medium.

4. The method as claimed in claim 1, wherein an instant for printing the other portion of the printed content on the second surface is determined based on the detecting of the trigger mark.

5. The method as claimed in claim 1, wherein the compensating further comprises comparing the variation in the distance between the leading edge and the trailing edge for each of the trigger marks with a predefined threshold.

6. A system for front-to-back registration of printed content on a print medium, the system comprising:
    a processor;
    a print controller including a trigger mark detection module communicatively coupled to the processor,
    the trigger mark detection module to:
        receive a trigger signal, wherein the trigger signal is generated by a sensor upon detection of a trigger mark on a first surface of a print medium moving along a print path within a web-press, and wherein the trigger mark includes a leading edge and a trailing edge, wherein the leading edge and the trailing edge are non-parallel;
        based on the trigger signal, determine a distance between the leading edge and the trailing edge; and
        compare the distance between the leading edge and the trailing edge with a threshold value and obtain a measure of lateral wander of the print medium with respect to the print path; and the print controller to:

render for printing a portion of the printed content on a second surface of the print medium to compensate for the lateral wander of the print medium with respect to the print path.

7. The system as claimed in claim 6, where the distance between the trailing edge and the leading edge is a perpendicular distance from the leading edge to the trailing edge.

8. The system as claimed in claim 6, further comprising a print path controller to generate a signal to actuate and control a steering mechanism of the web-press, to compensate for the lateral wander of the print medium with respect to the print path.

9. The system as claimed in claim 6, further comprising a first print engine communicatively coupled to the processor, wherein the first print engine is to render, for printing, a first portion of the printed content and the trigger mark on the first surface of the print medium.

10. The system as claimed in claim 9, further comprising a second print engine communicatively coupled to the processor, wherein the second print engine is to render, for printing, another portion of the printed content on the second surface of the print medium.

11. The system as claimed in claim 10, wherein the second print engine initiates printing of the other portion of the printed content based on detection of the leading edge of the trigger mark.

12. A non-transitory computer-readable medium comprising instructions executable by a processing resource to:

render for printing, on a first surface of a print medium to be advanced in a print path direction, a series of trigger marks, each of the trigger marks including a leading edge and a trailing edge, the leading edge and the trailing edge being non-parallel;

determine a measured distance between the leading edge and the trailing edge for each of the trigger marks; and compensate for lateral wandering of the print medium with respect to the print path direction based on a variation in the measured distance between the leading edge and the trailing edge for each of the trigger marks, including determine a measure of the lateral wandering of the print medium and render for printing another portion of printed content on a second surface of the print medium to offset the measure of the lateral wandering.

13. The computer-readable medium of claim 12, wherein the trigger mark is polygonally shaped.

14. The computer-readable medium of claim 13, wherein the trigger mark is shaped as a trapezoid.

15. The computer-readable medium of claim 12, wherein the leading edge is perpendicular to the print path direction.

16. The computer-readable medium of claim 12, the non-transitory computer-readable medium further comprising instructions executable by the processing resource to:

render for printing a first portion of the printed content on the first surface of the print medium.

17. The method as claimed in claim 1, wherein the trigger mark is shaped as a trapezoid.

18. The system as claimed in claim 6, wherein the trigger mark is quadrilaterally shaped.

19. The system as claimed in claim 6, wherein the leading edge is perpendicular to the print path.

\* \* \* \* \*